March 3, 1931.  S. D. HARTOG  1,794,767
PISTON
Filed May 7, 1921
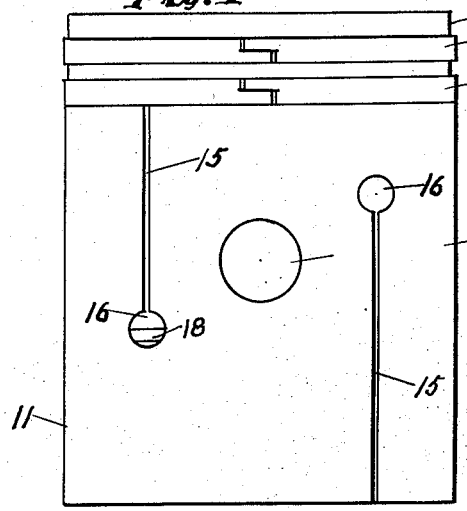
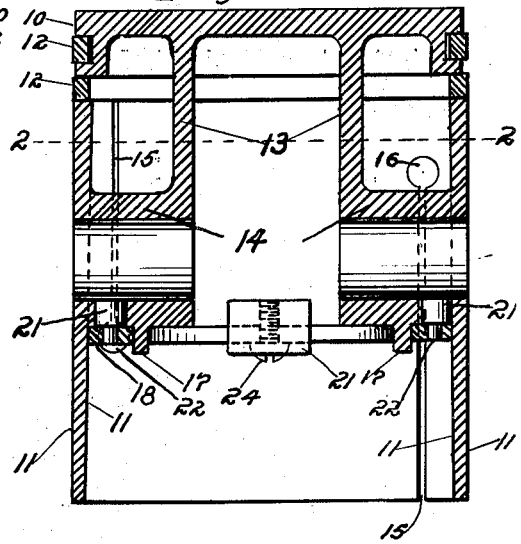
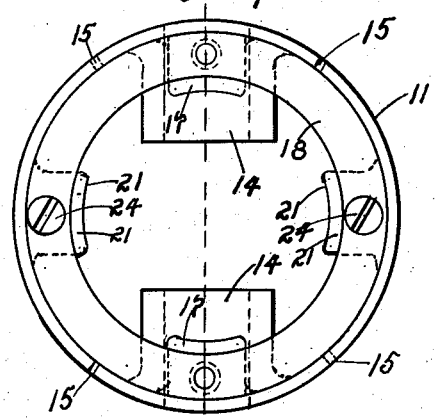
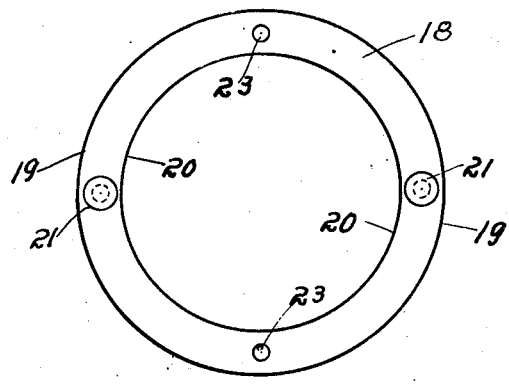
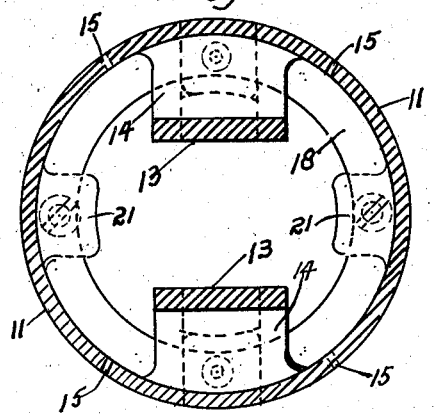
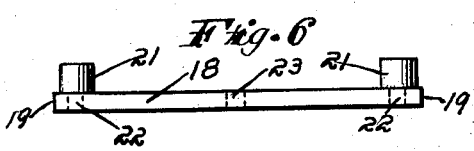
Inventor
Stephen D. Hartog Patented Mar. 3, 1931

1,794,767

UNITED STATES PATENT OFFICE

STEPHEN D. HARTOG, OF ST. LOUIS, MISSOURI, ASSIGNOR, BY MESNE ASSIGNMENTS, TO THE CLEVELAND TRUST COMPANY, OF CLEVELAND, OHIO, A CORPORATION OF OHIO

PISTON

Application filed May 7, 1921. Serial No. 467,587.

This invention relates to pistons.

Experience has proven that pistons having slots cut in the body or guide section become smaller than the bore of the cylinder after a definite period of usage, owing to the fact that the slots inevitably close causing the piston to become smaller than the bore of the cylinder to such an extent that the piston not only will rattle but also will allow the passage of lubricating oil into the combustion chamber interfering with proper ignition.

It has likewise been proven that pistons expand most extensively when heated diametrically across the piston pin supporting bosses and, to overcome this impediment, it is the common practice to under cut the peripheral surface of the piston on diametrically opposite sides of the piston pin supporting bosses. Prior art constructions disclose that the excess expansion of the piston diametrically across the piston pin supporting bosses is prevented to some extent by the manner in which the piston pin is arranged within the bosses, whereby the piston pin holds the opposite sides of the piston in a tensionally compressed condition.

Other prior art constructions disclose means for controlling the excess expansion and contraction of the piston diametrically by having one or more metal bars disposed above the piston pin bosses. These constructions relate to the controlling feature only, with respect to positions directly across the diameter permitting the piston to expand and thereby distort its otherwise circumferentially true area to an out of round form.

The present invention relates to that construction of piston in which means are provided to prevent the slots cut in the guide section from closing while in use, and for controlling the excess expansion diametrically across the piston pin supporting bosses, and uniformly circumferentially over the entire piston body or guide section.

The object of the present invention is to construct a piston in such way, irrespective of the metallic composition from which the piston is made, as to limit its expansion and contraction when subjected to heat, to that of a member having a different ratio of expansion of less capacity than that of the material out of which the piston is made.

To such ends the present invention comprises a piston having head and body portions, the head portion being separated from the body portion. The head and body portions are held together by means of internally disposed ribs, having integral intersections at the under surface of the head, and piston pin supporting bosses formed within the body portion of the piston. Slots or a series of slots are formed adjacent the piston pin supporting bosses and positioned diametrically opposite each other. A sheet metal ring positioned within the body portion of said piston is adapted to be seated in a countersunk surface at the lower most extremity of the piston pin supporting bosses, and in a like surface formed in oppositely disposed lugs within the piston body enabling the sheet metal ring thus formed and positioned within the body of the piston to prevent the excess expansion and contraction of the body portion of the piston.

For the purpose of enabling others to understand, make and use this invention the following description is given supplemented by the accompanying drawing in which:

Figure 1 is a vertical elevation.

Figure 2 is an end view in the interior of the body.

Figure 3 is an elevation in section along the line 1—1 of Figure 2.

Figure 4 is an elevation of a sheet metal ring.

Figure 5 is a plan view along the line 2—2 of Figure 3.

Figure 6 is an end view in assembly of Figure 4.

Figure 7 is an elevation of a stud member adapted for assembly with a sheet metal ring as illustrated in Figures 4 and 6.

In the drawing like numerals indicate like parts throughout the several views.

10 is the head portion. 11 is the body portion of the piston. The head portion has the usual piston rings 12 positioned within the grooves, with the exception in this case that the lowermost piston ring groove is cut entirely through the body separating the head 10 from the body 11. Longitudinally extending ribs 13 are formed integral with the under surface of the head 10 and connect integrally with piston pin supporting bosses 14. At each side of the piston pin supporting bosses 14 slits 15 are cut lengthwise of the axis of the body 11 and terminate in apertures 16 drilled through the body 11. The purpose of cutting the slots 15 in the body 11 is to provide a yielding capacity both circumferentially and diametrically for the entire body 11. At the lowermost surface of the piston pin supporting bosses 14 a slight elevation or projection 17 is formed, having a countersunk surface into which a sheet metal ring 18 is fitted. The outer edge 19 and the inner edge 20 of said rings are adapted to fit snugly within the countersunk portion of the projection 17. Diametrically opposite each other within the body of the piston 11 are lugs 21 which are countersunk and in which a portion of the sheet metal ring 18 is seated. Within the piston pin supporting bosses 14 holes are drilled to receive studs 21, a portion of the end of each of said studs being reduced in diameter at 22, for the purpose of being driven and riveted into the sheet metal ring 18 and thereby securely held therein. At suitable diametrically opposite positions holes 23 are formed within the metal ring 18 for the purpose of receiving screws 24, by means of which the sheet metal ring is held within the countersunk surface of the lug 21 and the body 11.

In describing the piston as illustrated the head 10 is separated from the body 11 yet held together by the ribs 13 which are integrally connected with the head and the piston pin supporting bosses 14. The body 11 is provided with slots cut through and extending part of the way lengthwise of the vertical axis thereof, thereby providing a yielding capacity entirely around its circumference.

For the purpose of preventing the closing of the slots of the piston and a reduction in the diameter of the body, a sheet metal ring is employed and positioned within the body at the most advantageous position for maximum effectiveness, namely at the extremity of the ribs 13 and the bosses 14, thereby resisting expansion which is most pronounced through this heavy section of the piston. As the body of the piston is constructed to have a yielding capacity, and the ring is positioned within a countersunk surface and held securely therein, the entire contour of the piston body is controlled entirely circumferentially by the heat transmitted to the sheet metal ring causing the expansion thereof.

It is to be further noted that the sheet metal ring 18 may be made from such material as is least affected by heat, for instance, steel having in its composition a certain percentage of tungsten, thereby providing a metallic composition that will stand a heat temperature far in excess of that to which pistons in hydro-carbon engines are subjected without any appreciable distortion or expansion.

I am aware that the invention may be varied in numerous particulars without departing from the spirit and scope thereof. I do not limit myself unessentially, but what I claim and desire to secure by Letters Patent is:—

1. A piston comprising a head and yieldable body separated from each other, wrist pin bosses connected with the head, and means directly connected to the bosses and to the body, said means being of metal having a different coefficient of expansion from the body and being operable to control the expansion and contraction of the body.

2. A piston of the character described comprising a head and body, internal ribs connecting said head and body, said internal ribs having integral connection with the piston pin supporting bosses, oppositely disposed lugs arranged within said body, a sheet metal ring engaging the lower surface of said bosses and lugs and arranged to be supported thereby, and a series of slits cut through the body portion of said piston for the purpose of providing a yielding capacity for said body whereby said ring member is adapted to limit the expansion and contraction of the body of said piston and to prevent the closing of the slits formed within the body.

3. A piston provided with a circumferentially yielding body, a sheet steel member having within its composition a certain percentage of tungsten arranged within and supported by said body, said sheet steel member being adapted to limit the expansion and contraction of the yielding body of said piston and to hold said body circumferentially true and uniform.

4. A piston including a head, a yieldable skirt, wrist pin bosses, connections between said bosses and the head, and a member having a different coefficient of expansion from the skirt, said member being connected to the skirt and to said bosses, whereby the expansion and contraction of the skirt is controlled by said member.

5. A piston comprising a head and a skirt, said skirt having longitudinal slits therein, piston pin bosses having connection with the head of the piston, and a controlling ring having a coefficient of expansion different from the skirt of the piston, said ring having operative connection with the bosses and with the skirt whereby the expansion and contraction of the skirt of the piston is controlled by the expansion and contraction of said ring.

6. A piston comprising a head and yieldable skirt, piston pin bosses, connections between the head and bosses, and a member having a different coefficient of expansion from the skirt disposed within the skirt and connected to the bosses and to the skirt, whereby the expansion and contraction of the skirt within the zone of the bosses is controlled by said member.

7. A piston comprising a head, a skirt separated from the head, said skirt being provided with slots extending from the lower end of the piston upwardly toward the head and also with slots extending downwardly from the separation between the head and skirt, piston pin bosses supported within the skirt, and a continuous unbroken metallic ring positioned contiguous to the lower surface of the pin bosses and operatively connected with the skirt and with said bosses, the metal of said ring having a coefficient of expansion different from the metal of the skirt and of the bosses.

8. A piston comprising a head, a yieldable body, wrist pin bosses connected with the head, a member positioned in and rigidly connected with said bosses and said body, said member having in its composition a certain percentage of tungsten and differing in thermal expansion capacity from the material from which the piston is made, and said member being adapted to restrict compression and restrain the expansion of the yieldable body of the piston.

9. A piston including a head, a yieldable skirt, wrist pin bosses, connections between said bosses and the head, and a member having a different coefficient of expansion from the skirt, said member being connected to the skirt and directly connected to and in contact with said bosses, whereby the expansion and contraction of the skirt is controlled by said member.

10. In a piston, the combination of a head, a body provided with circumferential interruptions, wrist pin bosses integral with the piston body, and means in contact with and directly connected to the bosses spanning said interruptions and made of a material of a lower coefficient of heat expansion than the material of which the piston is made and regulating the expansion and contraction of the body due to the heat.

11. In combination, a piston head having wrist pin bosses integral therewith, a piston skirt, and control means secured to said skirt and extending across said bosses to control the expansion and contraction of said skirt, said control means having a lower coefficient of thermal expansion than cast iron, said control means and said bosses being in contact and directly connected together.

12. In a piston for an internal combustion engine, the combination of a head having a top and depending cylindrical sides provided with a groove on the outside for a piston ring, a body portion substantially coaxial with the piston head and of greater altitude, means connected at its ends respectively to the head and body within the periphery of each for connecting the head to the body, the head and body being separated along their peripheries by a circumferential air gap extending substantially entirely around the piston, piston pin bosses situated diametrically oppsite each other in the piston body, said body being provided with an opening extending from the lower edge of the body substantially vertically upward for a substantial distance less than the length of the body and permitting circumferential expansion and contraction of the lower portion of the body, and regulating means made of a material having a lower coefficient of heat expansion than the material of which the body is made mounted in the body portion a substantial distance upward from the lower edge of the body and regulating the expansion and contraction of the body portion adjacent the mounting of the regulating means to maintain it substantially the same as that of the said regulating means.

13. A piston comprising a head, piston pin bosses carried by the head, cylinder-bearing portions lying on the periphery of the piston between the pin bosses, the head and cylinder-bearing portions being formed of lighter weight metal than cast iron, and a control member of material less expansible than that of the head, said control member being directly connected to a boss, and to the cylinder bearing portions.

14. A piston comprising a head, piston pin bosses carried by the head, cylinder-bearing portions lying on the periphery of the piston between the pin bosses, the head and cylinder-bearing portions being formed of light weight metal, and control parts of material less expansible than the material of the head, each control part being directly connected to each cylinder-bearing portion, and each control part being also directly connected to a boss, the boss connection engaging the portion of the control part intermediate the points of connection with the cylinder-bearing portions.

15. A piston, comprising a head, a skirt circumferentially disconnected from the head having diametrically opposite openings extending downwardly from its upper end having slots extending upwardly from its lower end and terminating at points below the upper end of the skirt and above the plane of the lower edges of said openings, and webs forming integral connections between the head and the skirt.

16. In an internal combustion engine piston, the combination of a head and a body, said body having oppositely disposed wear faces and portions intermediate the wear faces providing therewith a generally annular body portion, piston pin bosses in the body and means connecting the head to the body, the head and body being separated by a gap, the continuity of the body being interrupted on each plane perpendicular to its long axis throughout the length of the body, and controlling means of lower coefficient of heat expansion than the material of the body controlling the expansion and contraction of the body due to heat changes.

17. In a piston, the combination of a head and body portion, the body portion being provided with an opening extending from the bottom edge of the body portion and terminating part way up the same and permitting the circumferential expansion and contraction of the lower part of the body portion, and control means made of a material of a lower coefficient of heat expansion than the body mounted in the piston well above the lower edge of the body portion and controlling the expansion and contraction due to heat of that portion of the body in which said control member is mounted.

18. In a piston for an internal combustion engine, the combination of a head provided with a top and depending circumferential peripheral walls provided with a circumferential groove for a piston ring, a body portion for the piston substantially coaxial with the head and of greater altitude than the head, said body having oppositely disposed wear faces and portions intermediate the wear faces providing therewith a generally annular body portion, means connecting the head and body together mounted within the periphery of the body, piston pin bosses mounted diametrically opposite each other, said bosses, head and head-body connecting means being integral, the head and body being separated from each other by an opening extending substantially entirely around the circumference of the piston, the body portion being interrupted and discontinuous on every plane horizontal to its altitude throughout the length of the body portion, and control means made of a material of a lower coefficient of expansion than the material of which the piston body is made connected in the piston and spanning interruptions of the continuity of the body and controlling the expansion and contraction of the body portion due to heat.

19. In an internal combustion engine piston, the combination of a head and body portion separated at their peripheries, the circumference of the body portion being interrupted, and means of a lower coefficient of heat expansion than the material of which the body is made spanning said interruption and controlling the expansion and contraction of the body portion due to heat.

20. In a piston, the combination of a head and body separated from each by a gap, connecting means for connecting the head and body together, piston pin bosses in the body, the connecting means for the head and body being connected to the body through said bosses, the body being interrupted circumferentially by a plurality of openings some of which begin at the top portion of the body and extend downward to below the plane of the piston pin bosses and terminate at their upper end in the opening between the head and the body and one at least of which begins at the lower edge of the body and extends upward to and terminates in the neighboring zone of the bosses, and means made of a material of a lower coefficient of heat expansion than the material of the piston body mounted in the piston and connected to the bosses and regulating the expansion and contraction of the piston due to heat.

21. In a piston, the combination of a head and body separated from each other by a gap, connecting means for connecting the head and body together, piston pin bosses in the body, the connecting means for the head and body being connected to the body through said bosses, the body being interrupted circumferentially by a plurality of openings some of which begin at the top portion of the body and extend downward to and terminate below the plane of the piston pin bosses and terminate in their upper end in the opening between the head and the body and one at least of which begins at the lower edge of the body and extends upwardly in the body and overlaps portions of certain of the downwardly extending openings, and means made of a material of a lower coefficient of heat expansion than the material of the piston body mounted in the piston and connected to the bosses and regulating the expansion and contraction of the piston due to heat.

22. In a piston, a head, a skirt separated from said head along its upper edge, said skirt being formed of a material having a high coefficient of thermal expansion, and transverse means of less expansible material than said skirt arranged to limit expansion of the skirt in a direction transverse to the piston pin, substantially as set forth.

23. In an internal combustion engine, a piston comprising a head, wrist pin bosses cast integrally with the head, a skirt slotted in a generally longitudinal direction, and a continuous metal ring within the skirt connected to each boss and having a coefficient of expansion substantially less than that of the cylinder wall, said ring being secured to the skirt and being adapted to maintain substantially constant the minimum necessary clearance between the skirt and cylinder wall, as set forth.

In confirmation hereof I hereto attach my signature.

STEPHEN D. HARTOG.